United States Patent Office 3,337,722
Patented Aug. 22, 1967

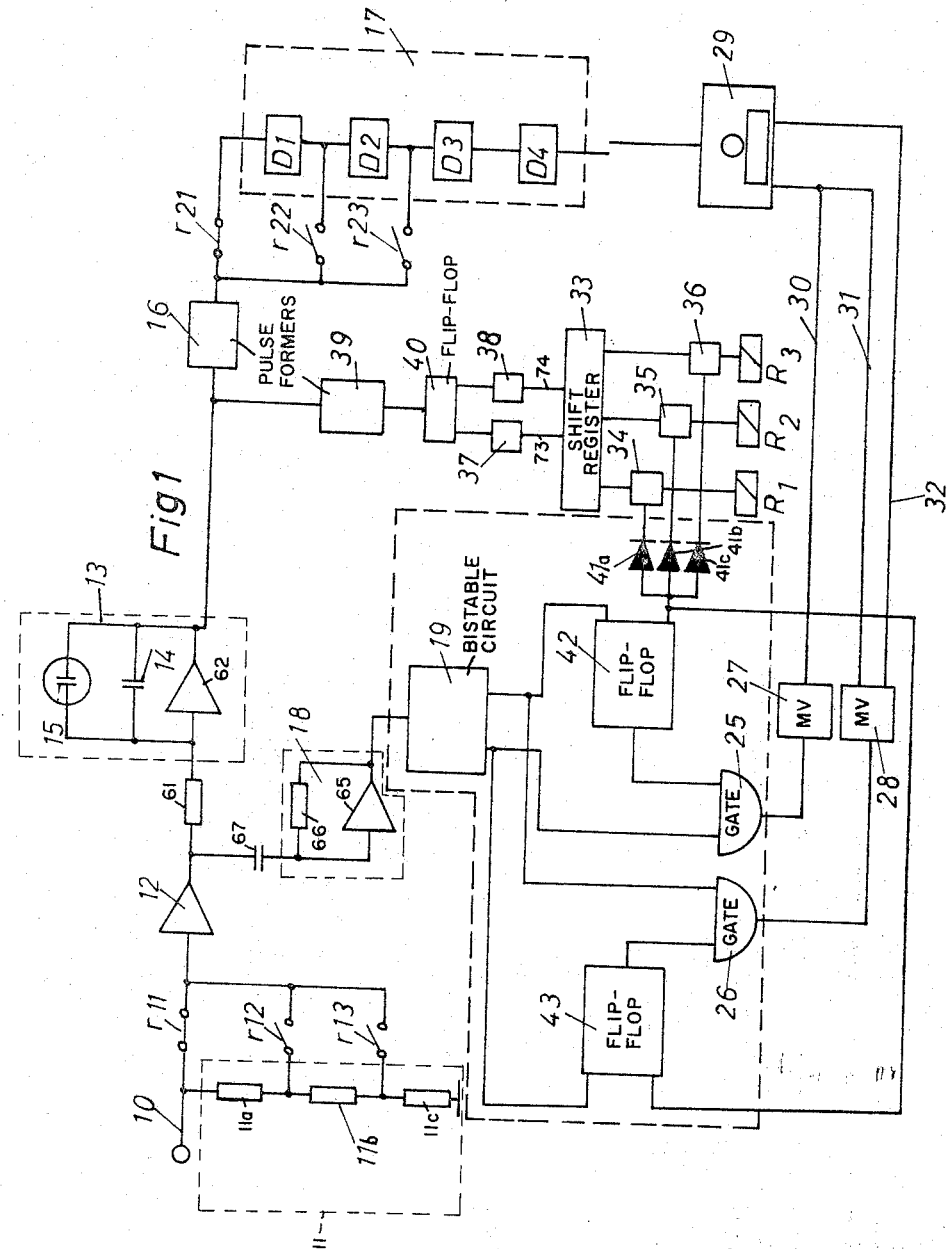

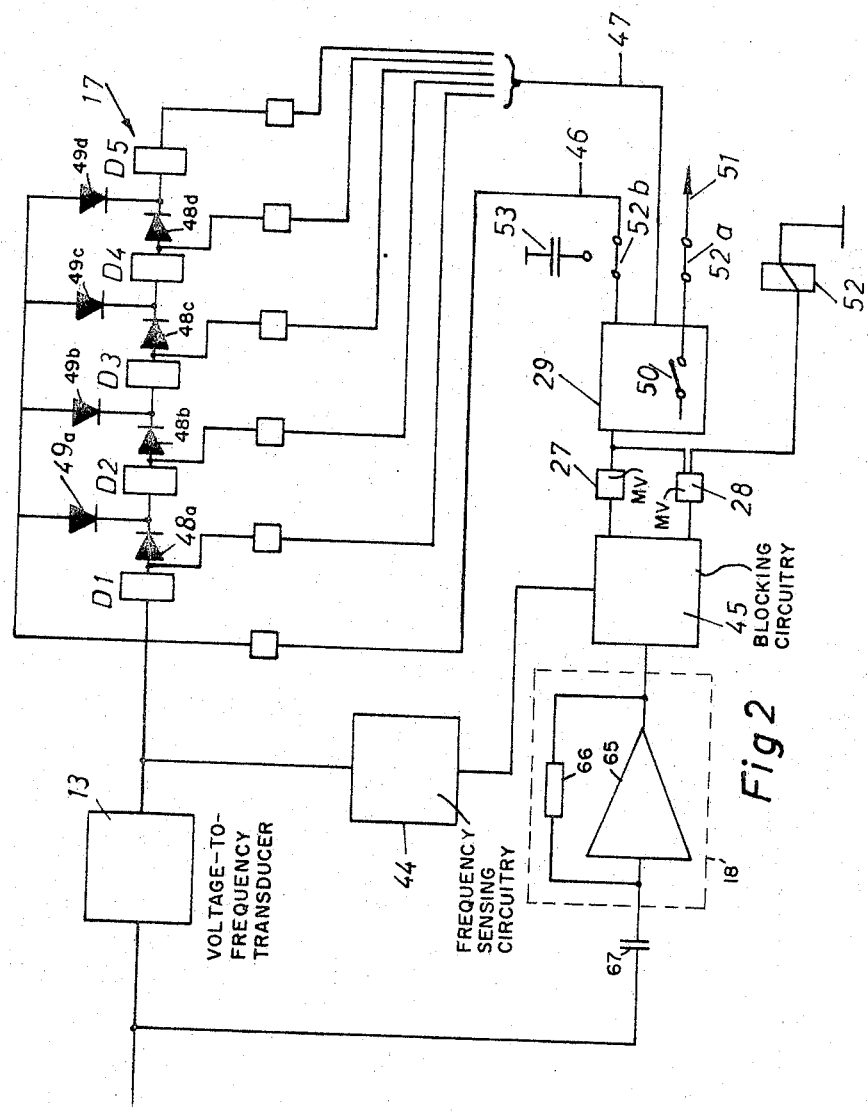

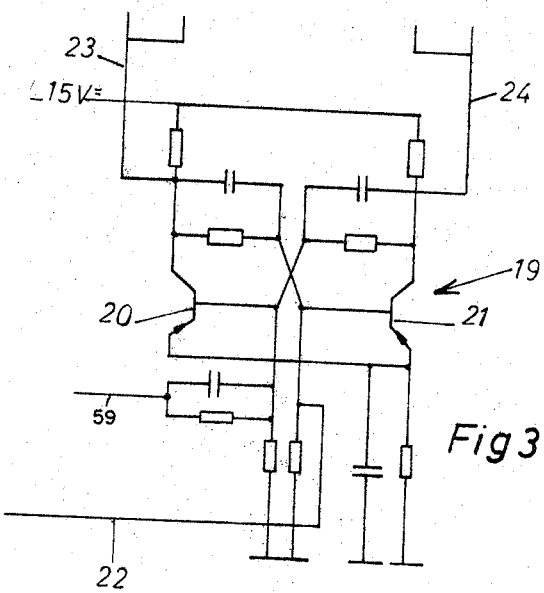
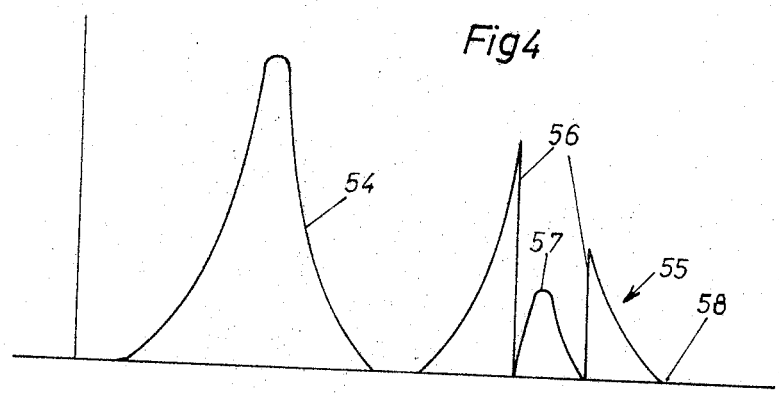

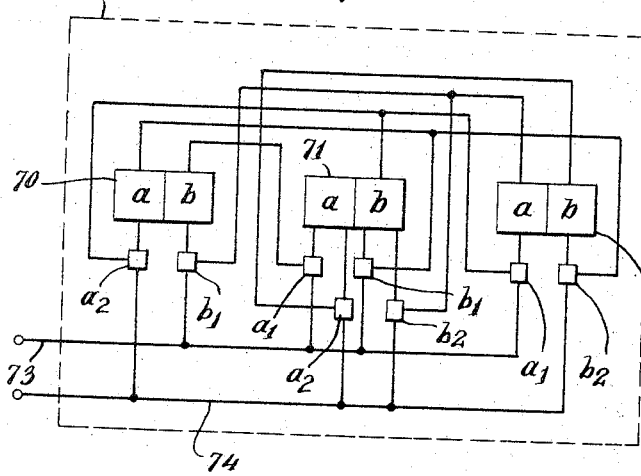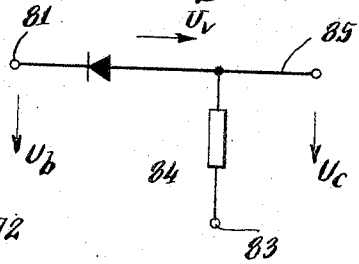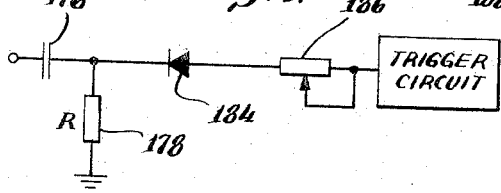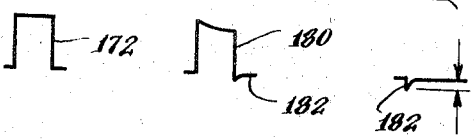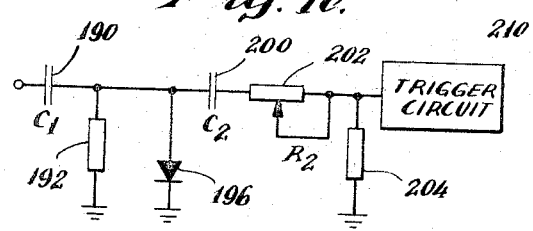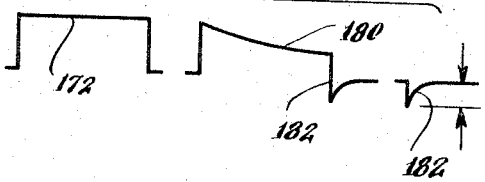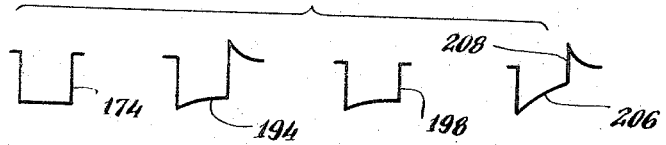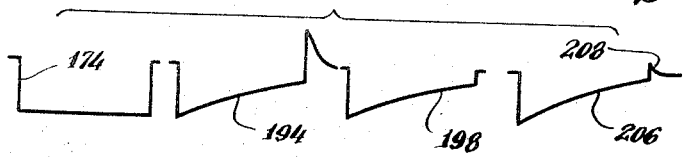

3,337,722
RECORDING APPARATUS
Gerhard Siess, Owingen, Kreis Uberlingen, and Wolfgang Schulz, Uberlingen (Bodensee), Germany, assignors to Bodenseewerk Perkin-Elmer & Co., G.m.b.H., Uberlingen (Bodensee), Germany
Filed Mar. 23, 1964, Ser. No. 354,823
Claims priority, application Germany, June 9, 1962, B 67,630; Apr. 5, 1963, B 71,426
4 Claims. (Cl. 235—92)

The present invention relates to recording apparatus particularly suitable for use in recording chromatograms developed by gas chromatographs. Although the invention will be described in the environment of a gas chromatograph, it will be obvious that its application is not limited thereto. This application is a continuation in part of application Ser. No. 286,401, filed June 7, 1963, now abandoned.

It is well known that gas chromatographs serve to analyze or separate gaseous mixtures. A gas chromatograph includes a separating column filled or covered with a suitable separating substance. A source of carrier gas is provided and a flow of carrier gas is maintained through the column. A measured volume of a gas or vapor mixture which is to be analyzed is introduced into the carrier gas flow by means of a sample pickup located at the entrance of the separating column. This sample is rinsed through the separating column by the carrier gas flow. The components of the mixture travel through the column and elute at different times which are dependent upon the degree of interaction or affinity between the components and the separating substance. A detector, located at the exit of the separating column, develops an electrical signal which varies in accordance with the respective concentrations of the mixture components. Usually, the detector signal is recorded as a function of time on a strip chart by a suitable recording device. The recording, known as a chromatogram, is a series of bell-shaped, curved peaks, each peak corresponding to a separate mixture component which appears at the exit of the separating column. The total concentration of a single component is proportional to the area of its curve or to the time integral of the detector signal.

In the past, chromatograms have been interpreted by planimetering the individual peaks so as to obtain the time integrals of the individual peaks and consequently the concentrations of the sample components. This method has been found to be complicated and the source of many errors. In addition, planimetering is particularly undesirable from the aspect that the result of the analysis is not on hand at once, and it is, therefore, not possible to interrupt a running operation because of some result of the analysis.

Techniques are known which avoid these disadvantages. These techniques involve the automatic integration of the detector signal and the printing of the individual integrals by means of a type printer. In one arrangement, a pick-up potentiometer is coupled to the recorder and the output of the potentiometer varies in proportion to the detector signal. The output of the potentiometer is coupled to a voltage-to-frequency transducer which develops a series of impulses having a frequency proportional to the potentiometer signal. These impulses are fed to a counter which counts the impulses and provides a digital indication of the time integral of the detector signal. The impulses are simultaneously supplied to an analog-to-digital converter which provides an indication corresponding to the instantaneous amplitude of the detector signal. The analog-to-digital converter operates in such a way that it counts the impulses from the voltage-to-frequency transducer during a prescribed period and supplies the resulting count in the form of a digital output. This digital output, being proportional to the amplitude of the detector signal, is fed to a numerical reference circuit which is capable of determining when the detector signal passes through a valley. This determination is made through digital numerical comparison. When such an indication is developed the printer is released and a digital printing of the integral value stored in the counting mechanism takes place.

While the integrating technique just described offers substantial advantages over the technique of planimetering, it nevertheless suffers from certain limitations and shortcomings. Since the input to the integrator is derived from the recorder by means of a pick-up potentiometer, the apparatus is subject to the inherent problems associated with the mechanical inertia of the recorder. This may result in the failure to record sharp peaks which appear only temporarily. In addition, the extreme value sensor and the analog-to-digital converter are rather complicated and expensive.

It is an object of the present invention to provide a new and improved recording apparatus.

It is another object of the present invention to provide a recording apparatus not subject to the limitations and shortcomings described above in connection with presently known and utilized recording techniques.

Recording apparatus constructed in accordance with the present invention includes a voltage-to-frequency transducer having a limited range over which the frequency of the impulses developed by the transducer is linearly related to the amplitude of a signal supplied thereto and means for supplying an input signal to the voltage-to-frequency transducer. The invention also includes a counter for counting the impulses developed by the voltage-to-frequency transducer and sensing means for monitoring the level at which the voltage-to-frequency transducer is operating and for developing a control effect when a preselected level on the limited range of the voltage-to-frequency transducer is exceeded. Also included in the invention are means responsive to the control effect for attenuating the input signal by a prescribed factor when the preselected level is exceeded and for translating the attenuated signal to the voltage-to-frequency transducer and for discontinuing attenuation of the input signal by the prescribed factor when the operation of the transducer drops below the preselected level. The invention additionally includes means responsive to the control effect for increasing the counting rate of the counter by the same prescribed factor by which the input signal is attenuated when the preselected level is exceeded and for resuming the initial counting rate of the counter when the operation of the transducer drops below the preselected level. Finally, the invention includes means for extracting the total count of the counter at the occurrences of extreme values of the input signal, means for detecting the occurrences of extreme values of the signals supplied to the voltage-to-frequency transducer and for initiating the operation of the count extracting means when the extreme values are detected, and means responsive to the control effect for preventing the detection of occurrences of extreme values from passing to the count extracting means whenever the control effect is developed.

For a better understanding of the present invention, together with other and further objects thereof, reference is had to the following description, taken in connection with the accompanying drawings, and its scope will be pointed out in the appended claims.

Referring to the drawings:

FIGURE 1 shows recording apparatus constructed in accordance with the present invention;

FIGURE 2 shows portions of the FIGURE 1 apparatus in more detail;

FIGURE 3 shows the details of a bistable circuit which may be utilized in the apparatus of FIGURES 1 and 2;

FIGURE 4 shows a chromatogram and the effect on the signal from which the chromatogram is developed when this signal is supplied to the apparatus of the invention;

FIGURE 5 shows the details of a shift register which may be used in the apparatus of FIGURES 1 and 2;

FIGURE 6 is a circuit diagram of a diode gate which may be used in the FIGURE 5 shift register;

FIGURE 7 is a circuit diagram showing the details of a portion of the apparatus of FIGURES 1 and 2;

FIGURES 8 and 9 illustrate wave forms which are useful in explaining the operation of the present invention;

FIGURE 10 is a circuit diagram showing the details of a portion of the apparatus of FIGURES 1 and 2; and FIGURES 11 and 12 illustrate wave forms which are useful in explaining the operation of the present invention.

*Description and operation of recording apparatus*

Referring to FIGURE 1, an input signal which is to be recorded is applied to an input terminal 10. A voltage divider 11 is connected to the input terminal 10. This voltage divider may be composed of three fixed resistors 11a, 11b and 11c, the resistance values of which may, for the embodiment shown, be in the proportion 90:9:1. The tapping points of the voltage divider 11 at which voltages equal to the input signal, one-tenth of the input signal, and one one-hundredth of the input signal are available, are connected to the input of a direct current amplifier 12 through relay contacts $r_{11}$, $r_{12}$, and $r_{13}$. In a manner to be described hereinafter, one of the relay contacts $r_{11}$, $r_{12}$ and $r_{13}$ is closed while the other two are open. Relay contacts $r_{11}$, $r_{12}$, and $r_{13}$ are controlled by relays $R_1$, $R_2$, and $R_3$, respectively.

The output from the amplifier 12 is applied to the input of a voltage-to-frequency transducer 13 through an input resistor 61. The voltage-to-frequency transducer 13 includes a high gain amplifier 62 and a feed-back capacitor 14 connected between the input and output of amplifier 62. The portion of the voltage-to-frequency transducer 13 so far described corresponds to a conventional Miller integrator.

The voltage-to-frequency transducer 13 also includes a glow lamp 15 connected and parallel with capacitor 14. When a constant amplitude input signal is applied at the input terminal of the voltage-to-frequency transducer, the output signal of the transducer at first increases linearly. When the output signal reaches a level equal to the firing potential of the glow lamp 15, the glow lamp fires and rather abruptly discharges capacitor 14 down to the cut-off potential of the glow lamp, at which time the glow lamp turns off and the output signal is again permitted to rise linearly to the firing potential of the glow lamp. This operation is repeated so that a repetitive saw-tooth signal is developed by the voltage-to-frequency transducer 13, the frequency of this signal being proportional to the amplitude of the input signal supplied to the transducer.

The output impulses developed by the voltage-to-frequency transducer 13 are supplied to a counting device 17 by way of a pulse former 16. The counting device 17 is seen to have four decades $D_1$, $D_2$, $D_3$ and $D_4$. The output impulses from the voltage-to-frequency transducer 13 are supplied to the various decades of counting device 17 through relay contacts $r_{21}$, $r_{22}$, and $r_{23}$. Decade $D_1$ counts units digits, decade $D_2$ counts tens digits, and decade $D_3$ counts hundreds digits and decade $D_4$ counts thousands digits. Relay contacts $r_{21}$, $r_{22}$, and $r_{23}$ are controlled by relays $R_1$, $R_2$, and $R_3$ respectively.

If the total count of the impulses developed by the voltage-to-frequency transducer 13 is to be truly representative of the integral of each peak, the frequency of the impulses must truly be linearly related to the amplitude of the input signal. It has been found that a voltage-to-frequency transducer of the type utilized in the present invention has only a limited range, large as it may be, over which this linearity relationship exists. For relatively large amplitude input signals, the impulse frequency is not linearly related to the input signal amplitude.

If relay contacts $r_{11}$ and $r_{12}$ are closed, the input signal at terminal 10, without attenuation, is applied to the input of the voltage-to-frequency transducer 13. The output impulses from the voltage-to-frequency transducer are applied to the first decade $D_1$ of counting device 17 through relay contact $r_{21}$. With an increase in the amplitude of the input signal beyond a preselected level of operation at which point the frequency of the impulses developed by the voltage-to-frequency transducer is no longer linearly related to the amplitude of the input signal supplied to the transducer, relay contacts $r_{11}$ and $r_{21}$ open and relay contacts $r_{12}$ and $r_{22}$ close. Now, only one-tenth of the input signal is applied to the direct current amplifier 12. The amplitude of the signal supplied to the voltage-to-frequency transducer is now such that the voltage-to-frequency transducer is again operated in a range over which the frequency of the impulses developed by the transducer is linearly related to the amplitude of the signal supplied to the transducer.

An attenuation of the input signal causes a corresponding decrease in the impulse frequency of the voltage-to-frequency transducer 13. However, by opening relay contact $r_{21}$ and closing relay contact $r_{22}$, the impulses from the voltage-to-frequency transducer 13 are fed directly to the tens digit decade $D_2$ of counter 17 so that each impulse is weighted by a factor of ten. Thus, for an attenuation of the input signal by a factor of ten, there is a corresponding increase in the counting rate of counting device 17 by a factor of 10. This action is effective to confine the operation of the voltage-to-frequency transducer 13 below any preselected level. The amplitude of the input signal may now increase further without exceeding the range of linearity of the voltage-to-frequency transducer or overdriving the direct current amplifier 61 since only one-tenth of the actual input signal becomes effective at the amplifier and the transducer. There is no error in the indication developed by the counting device 17 because of this attenuation since compensation is provided by directing the impulses from the voltage-to-frequency transducer to a different decade. The same results are achieved for further increases of the amplitude of the input signal. When there is still further tendency for the voltage-to-frequency transducer to operate beyond the level of linearity, relay contacts $r_{12}$ and $r_{22}$ open and relay contacts $r_{13}$ and $r_{23}$ close so that only one one-hundredth of the input signal is supplied to the direct current amplifier 12. However, the impulses from the voltage-to-frequency transducer 13 are now fed to the hundreds decade $D_3$ of counting device 17.

Relays $R_1$, $R_2$ and $R_3$ which control the attenuation and release of attenuation of the input signal and the counting rate of counting device 17 are controlled by a shift register 33 through three transistors represented by reference numerals 34, 35 and 36. Referring to FIGURE 5, the shift register 33 is composed of three flip-flops 70, 71 and 72. At any particular time one of the flip-flops is in condition "1" and causes its associated relays $R_1$, $R_2$ or $R_3$ to be operative, while the other two flip-flops are in condition "0" and cause their associated relays to be inoperative. For the conditions illustrated in FIGURE 1, with relay contacts $r_{11}$ and $r_{21}$ closed, shift register 33 is in the condition "100."

An upper limit circuit 37, shown in FIGURE 1, senses when the frequency of the impulses developed by the voltage-to-frequency transducer 13 corresponds to a preselected level of operation of the transducer. While this preselected level will, in most cases, correspond to the upper limit of the range over which the impulse frequency is linearly related to the amplitude of the input signal, there is no requirement that this be so; any level may be chosen. When this preselected level or upper limit is sensed, the upper limit circuit 37 develops a signal which is fed through a forward connection 73 to the shift register 33 and condition "1" is shifted from flip-flop 70 to flip-flop 71. When the upper limit is again sensed, condition "1" is shifted from flip-flop 71 to flip-flop 72. A lower limit circuit 38, shown in FIGURE 1, senses when the impulse frequency of the voltage-to-frequency transducer 13 reaches a lower limit. This circuit develops a signal which is fed through a backward connection 74 of the shift register 33 which is effective to shift condition "1" from flip-flop 72 to flip-flop 71, or from flip-flop 71 to flip-flop 70, depending on the point of operation of the tranducer. With the shifting of condition "1," the relays $R_1$, $R_2$ and $R_3$ are synchronously affected so as to open or close relay contacts $r_{11}$, $r_{21}$, $r_{12}$, $r_{22}$, $r_{13}$, and $r_{23}$.

Referring again to FIGURE 5, each of the flip-flops 70, 71 and 72 is composed of two transistors $a$ and $b$. For condition "0," transistor $b$ is nonconductive and transistor $a$ is conductive. For condition "100" of the shift register 33, transistor $a$ of flip-flop 70 is nonconductive, and transistor $b$ is conductive. Each basic input of each of the flip-flops 70, 71 and 72 is connected with the forward connection 73 as well as with the backward connection 74 through one of the diode gates $a_1$, $a_2$, $b_1$, $b_2$. Connection with the forward connection 73 is established through diode gates $a_1$ and $b_1$, while connection with the backward connection 74 is established through diode gates $a_2$ and $b_2$. Each diode gate is controlled by the potential at a collector electrode of an adjacent stage. In particular, the collector electrode potential of transistor $a$ of each stage controls the diode gate $b_1$ connected between the forward connection 73 and transistor $b$ of the following stage, while the collector electrode potential of transistor $b$ of each stage controls diode gate $a_1$ connected between the forward connection 73 and transistor $a$ of the following stage. The collector electrode potential of transistor $a$ of each stage controls diode gate $b_2$ connected between a backward connection 74 and transistor $b$ of the preceding stage while the collector electrode potential of transistor $b$ of each stage controls diode gate $a_2$ connected between the backward connection 74 and transistor $a$ of the preceding stage. With the shift register of the type described herein comprising only three flip-flops, some diode gates and control connections may be omitted since the information from flip-flop 70 can only be shifted forward and that from flip-flop 72 can only be shifted backward. Consequently, the diode gates $a_1$ and $b_2$ are omitted from flip-flop 70 and the diode gates $a_2$ and $b_1$ are omitted from flip-flop 72.

The operation of the shift register may be most readily understood by means of an example. Assume that the shift register 33 is in condition "100," that is to say, transistor $a$ of flip-flop 70 is nonconductive, transistor $b$ of flip-flop 70 is conductive, while in flip-flops 71 and 72 transistors $a$ are conductive and transistors $b$ are nonconductive. Under these conditions:

In stage 70: gate $b_1$ is open due to transistor $a$ of flip-flop 72

In stage 71: gate $a_1$ is open due to transistor $b$ of flip-flop 70; gate $b_1$ is blocked due to transistor $a$ of flip-flop 70

In stage 72: gate $a_1$ is blocked due to transistor $b$ of flip-flop 71.

If a switching impulse is applied to the forward connection 73, the following happens:

In stage 70: the impulse passes through gate $b_1$ to transistor $b$ and reverses the flip-flop. Transistor $a$ is now conductive and transistor $b$ is nonconductive.

In stage 71: the impulse passes through gate $a_1$ to transistor $a$ and reverses the flip-flop. Transistor $a$ is now nonconductive and transistor $b$ is conductive.

In stage 72: no changes occur since gate $a_1$ is blocked.

The shift register has now changed to condition "010." In this condition the gates behave as follows:

In stage 70: gate $b_1$ is open due to transistor $a$ of flip-flop 72

In stage 71: gate $a_1$ is blocked due to transistor $b$ of flip-flop 72; gate $b_1$ is open due to transistor $a$ of flip-flop 70

In stage 72: gate $a_1$ is open due to transistor $b$ of flip-flop 71.

If a switching impulse is applied to the forward connection 73 the following happens:

In stage 70: the impulse passes through gate $b_1$ to the already nonconductive transistor $b$. Therefore, no reversal is effected.

In stage 71: the impulse passes through gate $b_1$ to transistor $b$ and reverses the flip-flop. Transistor $b$ is now nonconductive and transistor $a$ is conductive.

In stage 72: the impulse passes through gate $a_1$ to transistor $a$ and reverses the flip-flop. Transistor $a$ is now nonconductive and transistor $b$ is conductive.

By action of the second forward impulse the shift register is now in condition "001."

Returning to the intermediate condition "010" of shift register 33, under these conditions:

In stage 70: gate $a_2$ is open due to transistor $b$ of flip-flop 71

In stage 71: gate $a_2$ is blocked due to transistor $b$ of flip-flop 72; gate $b_2$ is open due to transistor $a$ of flip-flop 72

In stage 72: gate $b_2$ is open due to transistor $a$ of flip-flop 71

If a switching impulse is applied to the backward connection 74 the following happens:

In stage 70: the impulse passes through gate $a_2$ to transistor $a$ and reverses the flip-flop. Transistor $a$ is now nonconductive and transistor $b$ is conductive.

In stage 71: the impulse passes through gate $b_2$ to transistor $b$ and reverses the flip-flop. Transistor $b$ is now nonconductive and transistor $a$ is conductive In stage 72: the impulse passes through gate $b_2$ to transistor $b$. This transistor, however, is already nonconductive so there is no change in flip-flop 72.

Through the action of the impulses to the backward connection 74, the shift register 33 changes from condition "010" to the starting condition "100." The condition "1" is shifted to the right from stage to stage for each impulse applied to the forward connection 73, and to the left from stage to stage for each impulse applied to the backward connection 74. The three relays $R_1$, $R_2$, and $R_3$ are so controlled by the flip-flops 70, 71 and 72 that the respective relays are operative when the associated flip-flop is in condition "1" and inoperative when the associated flip-flop is in condition "0."

FIGURE 6 is a circuit diagram of the diode gate used in the shift register of FIGURE 5. The input impulse which is applied to the forward connection 73 or the backward connection 74 is coupled to the base 81 of the particular transistor $a$ or $b$ of the particular flip-flop through a diode 82. One side of the diode 82, the plate side for the arrangement shown, is coupled to the collector of the controlling transistor so that the collector potential of this transistor is applied at terminal 83 through a resistor 84. By way of example, the negative collector potential of transistor $b$ of stage 70 is applied to the terminal 83 of diode gate $a_1$ of stage 71, while the other side of the diode 82 is connected to the base electrode of transistor $a$ of stage 71. The input terminal 85 of this diode gate is connected to the forward connection 73. Therefore, a diode bias potential is applied to the diode 82:

$$U_v = U_b - U_c$$

If this difference in potential of $U_b$ and $U_c$ is positive the diode is blocked.

The impulses applied to the forward and backward connections 73 and 74, respectively, are supplied by the upper limit circuit 37 and the lower limit circuit 38. These two circuits are frequency sensitive. The operation of these circuits will be most readily understood by reference to FIGURES 1 and 7–12. The output impulses from the voltage-to-frequency transducer 13 are supplied to a flip-flop 40 through a pulse former 39. The flip-flop 40 supplies a rectangular signal 172 or 174 shown in FIGURES 8, 9, 11 and 12 of half the frequency of the signal from the voltage-to-frequency transducer 13. The duration of the half-wave of these signals 172 and 174 is greater for lower frequencies and smaller for higher frequencies. FIGURES 8 and 11 are intended to represent relatively high frequencies while FIGURES 9 and 12 are intended to represent relatively low frequencies. For high frequencies, upper limit circuit 37 will supply a signal, while for low frequencies, lower limit circuit 38 will supply a signal.

The lower limit circuit 38 to which rectangular signals 172 are applied is shown in detail in FIGURE 7. It is composed of an RC differentiating circuit having a condenser 176 and a resistor 178. When a rectangular signal 172 is supplied to the differentiating circuit, it produces a signal such as the one represented by wave form 180 in FIGURES 8 and 9. The leading edge of signal 172 is passed by condenser 176. Then condenser 176 charges exponentially so that the voltage across resistor 178 drops exponentially. The trailing edge of signal 172 is passed by condenser 176. The duration of signal 172 determines the amount that condenser 176 is charged and the amount of the overshoot 182 after the occurrence of the trailing edge of signal 172. For short durations of signal 172, condenser 176 is charged to a low level and only minor overshoots are developed as illustrated in wave form 180 of FIGURE 8. If, however, the rectangular signal 172 has a greater duration, corresponding to a lower frequency of impulses from the voltage-to-frequency transducer 13, the conditions are those represented in FIGURE 9. Here, too, the leading edge of the rectangular signal 172 is passed by the condenser 176. Now, however, the condenser 176 is charged a great deal more, so that at the time of the occurrence of the trailing edge of the rectangular signal 172 the condenser voltage is greater. Now, the overshoot 182 of wave form 180 is a great deal larger than the overshoot shown in FIGURE 8. A diode 184, shown in FIGURE 7, removes the positive portions of wave form 180 so that only the negative overshoots remain. These overshoots are fed to a Schmitt trigger circuit 188 through an adjusting resistor 186 which is provided as a sensitivity adjustment. The Schmitt trigger circuit 188 supplies a backward impulse to the backward connection 74 of the shift register 33. The circuits are so arranged that small negative overshoots are not sufficient to trigger the Schmitt trigger circuit 188. In other words, if the duration of the rectangular signal 172 exceeds a certain value, that is to say, the frequency of the impulses from the voltage-to-frequency transducer 13 falls below the lower limit value, the negative overshoots are sufficient to pass a critical level and energize the Schmitt trigger circuit 188.

When the lower limit value of the signal frequency is reached, the shift register is reversed from condition "001" to condition "010" or from condition "010" to condition "100." Accordingly, there is a change in which of the relays $R_1$, $R_2$, or $R_3$ becomes operative. For example, relay contact $r_{13}$ may be opened and relay contact $r_{12}$ may be closed so that the input signal to the voltage-to-frequency transducer 13 is increased by a factor of 10, as well as the frequency of the impulses developed by the voltage-to-frequency transducer. Through this action, the lower limit circuit 38 again receives signals of the type shown in FIGURE 8, which are not able to trigger the Schmitt trigger circuit 188.

The upper limit circuit 37 is shown in detail in FIGURE 10. This circuit also includes an RC differentiating circuit having a condenser 190 and a resistor 192. This differentiating circuit, functioning in a manner similar to the one shown in FIGURE 7, transforms the rectangular signals 174 of FIGURES 11 and 12 into wave forms 194 with the amount of exponential variation being dependent upon the length or duration of the rectangular signals 174. Again, the amount of the overshoot is dependent upon the duration of the rectangular signals 174. A diode 196, shown in FIGURE 10, is effective to remove the overshoots so that signals such as those represented by wave forms 198 are developed. Wave forms 198 are seen to have a steep leading edge followed by an exponential decay. The trailing edges of wave forms 198 are longer or shorter depending upon the duration of the rectangular signals 174. The signals represented by wave forms 198 are fed to a second differentiating circuit composed of a condenser 200, an adjusting resistor 202 and a fixed resistor 204. This second differentiating circuit develops signals such as the ones represented by wave forms 206. The leading edges of wave forms 198 are passed by condenser 200. The condenser 200, however, charges relatively quickly through resistor 204 so that wave forms 206 decay toward zero. It is seen that the wave forms 206 decay more rapidly than do wave forms 198, so that the output signal of the second differentiating circuit is almost equal to zero at the occurrence of the trailing edge of wave forms 198. The trailing edge is passed by condenser 200 and the condenser voltage again decays exponentially toward zero. The amount of the overshoots 208 is dependent upon the amount of the overshoots of wave forms 194 cut off by diode 196. Therefore, the amount of the overshoots 208 of wave forms 206 is dependent upon the duration of the rectangular signal 174 and consequently dependent upon the frequency of the impulses from the voltage-to-frequency transducer 13. Overshoots 208 control a Schmitt trigger circuit 210 which responds to those overshoots which have reached a certain level and consequently represent reaching a frequency of the impulses of the voltage-to-frequency transducer which is beyond the upper limit value. The Schmitt trigger circuit 210 supplies a forward impulse to the forward connection 73 of the shift register 33. In this way, the input signal to the voltage-to-frequency transducer 13 is reduced by a factor of 10 by the action of relays $R_1$, $R_2$ and $R_3$ so that a condition is created corresponding to FIGURE 12 wherein the overshoot 208 is not sufficient to trigger the Schmitt trigger circuit 210. Thus, the upper limit circuit 37 and the lower limit circuit 38 are two frequency sensitive circuits which supply output impulses when the impulse frequency of the voltage-to-frequency transducer reaches an upper or lower limit value. The output impulses developed by circuits 37 and 38 are, in turn, used to control the further operation of the shift register 33, which, in turn, controls the attenuating means and the means for increasing or decreasing the counting rate of the counting device 17.

Referring again to FIGURE 1, the recording apparatus of the present invention further includes an extreme value sensing circuit for detecting the occurrences of extreme values of the input signal. The indications developed by the extreme value sensing circuit are used to control a printing mechanism 29 which, in turn, interrogates the counting device 17 at particular times to determine the total count at the time of an interrogation. For example, when the extreme value sensing circuit detects the occurrence of a valley which precedes any bell-shaped curve corresponding to a component, the printing mechanism 29 is told, in effect, that a count is to be commenced. When the extreme value sensing circuit detects the occurrence of a valley at the end of the curve, the printing mechanism 29 is told, in effect, that the count is to be terminated, the counting mechanism is to be interrogated, and the total count is to be extracted and printed. The total count developed by the counting mechanism at this time represents the integral of the area underneath the particular curve. In addition, when the peak of a curve is sensed, the time of occurrence may be used as a measure of the retention time within the separating column of the component represented by the curve.

The extreme value sensing circuit used in the embodiment shown in FIGURE 1 includes a differentiating circuit 18 of conventional construction composed of an amplifier 65 and a resistor 66 connected between the output and the input of the amplifier. The output of amplifier 12 is connected to differentiating circuit 18 through a condenser 67.

The extreme value sensing circuit further includes a bistable circuit 19, the details of which are shown in FIGURE 3. The bistable circuit 19 includes a pair of transistors 20 and 21 which assume alternating states of conductivity depending upon the polarity of an input signal supplied from the differentiating circuit 18 along input wire 22. Specifically, for positive input signals which correspond to positive slope portions of the signal supplied to the differentiating circuit, the bistable circuit 19 assumes one condition of conductivity with one of the transistors 20, 21 being conductive while the other is nonconductive. When negative input signals, which correspond to negative slope portions of the signal supplied to the differentiating circuit, are supplied to the bistable circuit 19, it assumes an opposite condition of conductivity with the transistor which was previously conductive now being nonconductive and the transistor previously nonconductive now being conductive. By sensing the times at which the conductivity conditions of bistable circuit 19 switch and the sense of switching, the occurrence of an extreme value of the input signal may be detected and it may be determined whether this extreme value is a peak or a valley. Indications of the state of conductivity of transistors 20 and 21 are developed along wires 23 and 24 which are connected to the collectors of transistors 20 and 21, respectively. These indications are complementary rectangular signals. One level of these signals corresponds to conduction of the associated transistor, while the other level corresponds to nonconduction. A reset signal is applied along wire 59 to insure that when the instrument is turned on, the bistable circuit 19 assumes the proper initial conditions.

Because of the action of relays $R_1$, $R_2$, and $R_3$, and the respective relay contacts $r_{11}$, $r_{12}$ and $r_{13}$, the signal supplied to the voltage-to-frequency transducer 13 and the same signal supplied to the differentiating circuit 18 undergo discontinuities whenever a range change takes place within the transducer. These discontinuities or jumps are sensed as either maxima or minima, depending upon the direction of range change, by the extreme value sensing circuitry. By way of example, with a continuously increasing signal at input terminal 10, relay contact $r_{11}$ opens and relay contact $r_{12}$ closes when the amplitude of the input signal exceeds a particular level. At this point, the input signal to the voltage-to-frequency transducer 13 decreases by a factor of 10. To the extreme value sensing circuitry, this range change appears as a peak, when in fact the input signal at input terminal 10 is still increasing. A similar but opposite effect occurs when the input signal at input terminal 10 decreases and the relay contacts switch. It is obvious that if indications of these false peaks and valleys are permitted to control the printing mechanism 29 the final indications of the concentrations of the sample components will be erroneous.

In order to avoid the detection of false peaks and valleys from controlling the printing mechanism 29, additional circuitry is provided in the FIGURE 1 apparatus for preventing these false indications from passing to the printing mechanism. This circuitry includes a pair of flip-flops 42 and 43 each having two inputs. Each of the flip-flops 42 and 43 has one of its inputs connected to transistors 34, 35 and 36 through diodes 41a, 41b, and 41c, respectively. The second input to each of the flip-flops 42 and 43 comes from the outputs 23 and 24 of bistable circuit 19. In particular, output wire 23 is connected to one of the flip-flops, while output wire 24 is connected to the other flip-flop.

The output wires 23 and 24 from bistable circuit 19 are also individually connected to a pair of conventional gate circuits 25 and 26. A second input to each of the gate circuits 25 and 26 comes from the outputs of flip-flops 42 and 43 respectively.

The overall purpose of the circuitry just described is to prevent the indications of false peaks and valleys from passing through gate circuits 25 and 26 whenever there is a range change. This result is accomplished by coupling range change indications from shift register 33 through transistors 34, 35 or 36 and further through diodes 41a, 41b or 41c to both of the flip-flops 42 and 43. Such an input to flip-flops 42 and 43 will cause the development of an output signal from these flip-flops which is effective to block both of the gates 25 and 26. This, in turn, prevents the passage of indications of false peaks and valleys. Although relays $R_1$, $R_2$ and $R_3$ respond to the same signals which control the switching of flip-flops 42 and 43, the purely electronic flip-flops will switch prior to the activation of any of the relays $R_1$, $R_2$ and $R_3$. Diodes 41a, 41b and 41c are provided to prevent any reactions of the gating circuitry from passing back to the shift register 33 and its associated circuitry.

Flip-flops 42 and 43 are reset after a certain delay by a change in the output signals from bistable circuit 19 due to the fact that after the occurrence of every false peak, a false valley must occur and after the occurrence of every false valley a false peak must occur.

As previously mentioned, one state of conductivity of the bistable circuit 19 corresponds to positive input signals to the bistable circuit, the opposite state of conductivity of the bistable circuit corresponds to negative input signals to the bistable circuit and the times at which the bistable circuit switches from one state of conductivity to the other correspond to the occurrences of peaks and valleys. Because of this complementary relationship between the output signals developed at output wires 23 and 24, one of these signals may be used to control the printing device 29 to cause a printing of the total integral of a curve while the other signal may be used to control the recording of the amplitude of the peak or the retention time of the component corresponding to this peak. In other words, one of the signals may represent the occurrence of a valley while the other signal may represent the occurrence of a peak. Therefore, it may be presumed that in FIGURE 1 the output signal from the bistable circuit 19 supplied to gate circuit 25 represents the occurrence of valleys while the other output signal from the bistable circuit which is supplied to gate circuit 26 corresponds to the occurrence of peaks.

These signals, when permitted by the output signal from flip-flops 42 or 43, pass through the gate circuits 25 and 26, a pair of astable multivibrators 27 and 28, respectively, and a pair of wires 30 and 31, respectively, to the printing device 29.

FIGURE 2 shows in more detail portions of FIGURE 1 recording apparatus. Reference numeral 44 represents the frequency sensing portion of the apparatus of FIGURE 1. In particular, this includes the pulse former 39, flip-flop 40, upper limit circuit 37, lower limit circuit 38, shift register 33 and transistors 34, 35 and 36. Reference numeral 45 represents the blocking circuitry which prevents the passage of indications of false peaks and valleys. In particular, this includes the bistable circuit 19, flip-flops 42 and 43, and gate circuits 25 and 26.

Whenever the extreme value sensing circuitry detects the occurrence of a true peak or true valley, the indication developed by the bistable circuit 19 is passed through gate 25 or gate 26 to the associated astable multivibrator 27 or 28. The particular multivibrator which receives this indication is triggered and a signal is developed which is supplied along either line 30 or 31 to the printing mechanism 29. The reception by the printing mechanism 29 of such a signal causes the printing mechanism to pass ten interrogation pulses, in parallel, to each of the decades of the counting device 17 along wire 46 and through diodes, 49a, 49b, 49c, and 49d. After all of the ten interrogation pulses have been supplied to each of the decades, all the decades are back at their original number. As each decade is traversed in response to the interrogation pulses, each decade must pass through zero. At this time, carry pulses are developed by each decade which pulses are in turn supplied along wires 47 to the printing mechanism 29. These carry pulses are used to control the movement of the counter rollers within the printing device. In particular, each roller in the printing mechanism 29 corresponding to the various decades rotates in synchronism with the ten interrogation pulses supplied to the counting device 17. Whenever a carry pulse is developed by any of the decades, that carry pulse is supplied along one of the wires 47 to the corresponding roller within the printing device 29 and causes this roller to stop rotating. This causes the type associated with the count stored in the corresponding decade of the counter to be aligned and ready for printing. Once all the counter rollers within the printing mechanism 29 are set the printing is effected. Subsequent to printing, a contact 50 within the printing mechanism 29 closes and feeds a signal to the counting device 17 by way of wires 51 to clear the counter.

A plurality of diodes 48a, 48b, 48c and 48d are positioned between each of the decades of the counting device 17. These diodes prevent reactions between the various decades. Diodes 49a, 49b, 49c and 49d prevent reactions from the counter from passing back to the printing mechanism 29.

Whenever a true peak occurs and such a peak is detected, clearing of the counting device 17 should be prevented since at this time the total count does not represent the total concentration of the particular component. This prevention of clearing of the counting device 17 is accomplished by passing the output from the astable multivibrator 28, through which true peak indications are passed, to a relay 52. When relay 52 is energized its contact 52a creates an open circuit in wire 51 and thereby prevents clearance of the counting device 17. Simultaneously, interrogation pulses from counting mechanism 29 may be passed directly to ground by means of a second relay contact 52b and a capacitor 53.

FIGURE 4 shows a chromatogram and the effect on the signal from which the chromatogram is developed when this signal is supplied to the apparatus of the invention. Curve 54 represents the actual curve of the chromatogram. Curve 55 shows the effects of attenuation and release of attenuation when the input signal from which curve 54 is developed exceeds or returns to the range of linearity of the voltage-to-frequency transducer. Peaks 56 are false peaks and are the result of the attenuation and release of attenuation of the signal to be recorded. The indications developed from these false peaks are prevented from passing to the printing mechanism 29. Peak 57 corresponds to the true peak and the time of occurrence of this peak may be recorded. However, the counting device 17 is not cleared at this time. Valley 58 is a true valley and the occurrence of this valley is detected and the integral value of the curve is printed. At this time the counting device 17 is cleared. The total integral it not affected by a change in attenuation of the input signal since compensation from such attenuation is provided by increasing the counting rate of counting device 17.

While there has been described what is at present considered to be the preferred embodiment of this invention, it will be obvious to those skilled in the art that various changes and modifications may be made therein without departing from the invention, and it is therefore aimed to cover all such changes and modifications as fall within the true spirit and scope of the invention.

We claim:
1. Recording apparatus comprising:
   a voltage-to-frequency transducer having a limited range over which the frequency of the impulses developed by said transducer is linearly related to the amplitude of a signal supplied thereto;
   means for supplying an input signal to said voltage-to-frequency transducer;
   a counter for counting the impulses developed by said voltage-to-frequency transducer;
   sensing means for monitoring the level at which said voltage-to-frequency transducer is operating and for developing a control effect when a preselected level on said limited range is exceeded;
   means responsive to said control effect for attenuating said input signal by a prescribed factor when said preselected level is exceeded and for translating said attenuated signal to said voltage-to-frequency transducer and for discontinuing attenuation of said input signal by said predescribed factor when the operation of said transducer drops below said preselected level;
   means responsive to said control effect for increasing the counting rate of said counter by the same prescribed factor by which said input signal is attenuated when said preselected level is exceeded and for resuming the initial counting rate of said counter when the operation of said transducer drops below said preselected level;
   means for extracting the total count of said counter at the occurrences of extreme values of said input signal;
   means for detecting the occurrences of extreme values of said signals supplied to said voltage-to-frequency transducer and for initiating the operation of said count extracting means when said extreme values are detected;
   and means responsive to said control effect for preventing said detection of occurrences of extreme values from passing to said count extracting means whenever said control effect is developed.

2. Recording apparatus comprising:
   a voltage-to-frequency transducer having a limited range over which the frequency of the impulses developed by said transducer is linearly related to the amplitude of a signal supplied thereto;
   means for supplying an input signal to said voltage-to-frequency transducer;
   a decimal counter having a plurality of decade stages for counting the impulses developed by said voltage-to-frequency transducer;
   frequency sensitive means responsive to the impulses developed by said voltage-to-frequency transducer for monitoring the level at which said voltage-to-frequency transducer is operating and for developing a control effect when a preselected frequency on said limited range is exceeded;
   means responsive to said control effect for attenuating said input signal by a decimal power when said preselected frequency is exceeded and for translating said attenuated signal to said voltage-to-frequency transducer and for discontinuing attenuation of said input signal by said decimal power when the operation of said transducer drops below said preselected frequency;
   means responsive to said control effect for coupling said impulses developed by said voltage-to-frequency transducer to that decade stage which counts by the same decimal power by which said input signal is attenuated when said preselected frequency is exceeded and for resuming the initial counting rate of said counter when the operation of said transducer drops below said preselected frequency;

means for extracting the total count of said counter at the occurrences of extreme values of said input signal;

means for detecting the occurrences of extreme values of said signals supplied to said voltage-to-frequency transducer and for initiating the operation of said count extracting means when said extreme values are detected;

and means responsive to said control effect for preventing said detection of occurrences of extreme values from initiating the operation of said count extracting means whenever said control effect is developed.

3. The apparatus of claim 2 wherein the means for detecting the occurrences of extreme values of the signals supplied to the voltage-to-frequency transducer includes a differentiating circuit responsive to the signals supplied to the voltage-to-frequency transducer and a bistable circuit responsive to the differential signal developed by the differentiating circuit for developing a first signal representative of one state of conductivity of the bistable circuit and a second signal representative of an opposite state of conductivity of the bistable circuit.

4. The apparatus of claim 3 wherein the means for preventing the detection of occurrences of extreme values from passing to the count extracting means includes a pair of gate circuits individually responsive to the two signals developed by the bistable circuit and a pair of flip-flops responsive to the control effect for developing signals to individually control the gate circuits and block the gate circuits from passing the signals developed by the bistable circuit whenever the control effect is developed.

References Cited

UNITED STATES PATENTS

| | | | |
|---|---|---|---|
| 2,981,107 | 4/1961 | Anderson | 324—99 |
| 3,185,820 | 5/1965 | Williams | 340—347 X |
| 3,219,803 | 11/1965 | Jones | 235—92 |
| 3,260,943 | 7/1966 | Huelsman | 235—154 X |

MAYNARD R. WILBUR, *Primary Examiner.*

G. J. MAIER, *Assistant Examiner.*